United States Patent [19]

Muirhead

[11] Patent Number: 5,137,322
[45] Date of Patent: Aug. 11, 1992

[54] PICKUP TRUCK CHEST LINER ASSEMBLY

[76] Inventor: Scott Muirhead, 13206 Troy St., Oak Park, Mich. 48237

[21] Appl. No.: 441,537

[22] Filed: Nov. 27, 1989

[51] Int. Cl.⁵ .............................................. B60R 13/01
[52] U.S. Cl. .................................................. 296/39.2
[58] Field of Search ................ 296/39.1, 39.2, 37.6; 224/42.42

[56] References Cited

U.S. PATENT DOCUMENTS

| | | | |
|---|---|---|---|
| D. 271,009 | 10/1983 | Fishler | 296/39.2 X |
| 3,814,473 | 6/1974 | Lorenzen | 296/39.2 |
| 4,003,596 | 1/1977 | Robertson | 296/37.6 X |
| 4,215,896 | 8/1980 | Drouin | 296/37.6 |
| 4,488,669 | 12/1984 | Waters | 224/42.42 X |
| 4,580,827 | 4/1986 | Feagan | 296/37.6 |
| 4,906,040 | 3/1990 | Edwards | 296/39.2 |
| 4,946,215 | 8/1990 | Taylor | 296/37.6 |

Primary Examiner—Margaret A. Focarino
Assistant Examiner—Gary C. Hoge
Attorney, Agent, or Firm—Irving M. Weiner; Robert M. Petrik; Joseph P. Carrier

[57] ABSTRACT

An assembly for installation into the bed of a pickup truck consisting of a cargo chest and a liner insert combination is described. The assembly is adapted to be inserted into the bed of the pickup truck to provide a secure cargo chest and a protective lining. The assembly is adapted to receive one or more chest lids hingedly and lockably attached to provide security and protection for the cargo in storage within the chest. The cargo chest liner insert assembly, in one embodiment, is adapted for a cargo chest lid which opens as one piece from the front of the chest assembly, and in other embodiments for cargo chest lids which hinge at the center for chest access from the sides of the pickup truck. In still another embodiment, the assembly is adapted to include cargo compartments in the opposed wheel well extensions. The upper perimeter flange of insert assembly can be adapted to provide an over the rail or an under the rail truck bed border. The assemblies in each embodiment are further adapted to ensure nestability for consolidated storage and shipment by providing inwardly sloped walls and rounded corner radii. The assembly also provides a tailgate liner piece.

9 Claims, 2 Drawing Sheets

PICKUP TRUCK CHEST LINER ASSEMBLY

BACKGROUND OF THE INVENTION

1. Field of the Invention

This invention is generally directed to a liner insert for a pickup truck cargo bed. More particularly, to an insert liner combining the features of a protective bed liner and a storage chest into one assembly. The liner insert is unitarily formed and is adapted to receive an independently formed chest lid which is hingedly attached and lockably secured to the liner insert for the purpose of providing a secure storage chest.

2. Description of the Prior Art

Pickup truck vehicles are used for both work related activities and personal transportation. The pickup truck bed provides space for both work related and personal cargo. In order to prevent cargo from damaging the painted metal surface of the truck bed it may be desirable to insert a protective liner into the pickup truck bed.

There are several prior art devices that discloses a protective truck bed liner insert. Some of these include U.S. Pat. Nos. 3,814,473 to Lorenzen, 3,881,768 to Nix, 4,111,481 to Nix et al, 4,333,678 to Munuz et al, 4,336,863 to Nix et al, 4,341,412 to Wayne, 4,540,214 to Wagner, 4,572,568 to Kapp et al, 4,575,146 to Markos, 4,592,583 to Oresen et al and 4,872,720 to Nagy.

Work related and personal cargo can be stored inside the truck bed. An open truck bed does not provide cargo with protection against damaging weather, environmental exposure, theft or vandalism. It may be desirable to secure cargo within auxiliary storage devices, such as those disclosed in U.S. Pat. Nos. 1,404,484 to Schoomaker, 3,640,423 to Parker et al, 3,854,621 to Parry, 3,987,829 to Leone, 4,266,950 to Gillet, U.S. Pat. Nos. Des. 259,413 to Renkopf, 258,950 to Wright, 285,673 to Waters, and French Patent No. 298,626.

There are still other prior art devices that discloses assemblies which may be placed upon the truck bed for cargo storage. These include U.S. Pat. Nos. 2,784,027 to Temp, 3,405,999 to Kozicki, 3,727,971 to Sisler, 4,003,595 to Robertson, 4,288,011 to Grossman, and U.S. Pat. No. Des. 248,386 to Hefner.

When it is desirable to provide protection for cargo within the truck bed, it is also possible to use a truck bed canopy, of which U.S. Pat. No. 4,627,655 to Collins is an example. Alternatively, it is also possible to install a tonneau cover such as that disclosed in U.S. Pat. No. 4,762,360 to Huber.

None of the above prior art references suggest combining into one assembly a protective liner and a storage chest. Such a combined truck bed liner and tool compartment is disclosed in U.S. Pat. No. Des. 271,009, this device has several limitations which the present invention successfully overcomes.

In FIGS. 4 and 5 of Fishler the right and left liner and compartment walls rise perpendicularly from the liner floor and compartment bottom. With this arrangement, a number of the Fishler devices can not be nested for economical storage and shipping. The vertical side walls of the Fishler device also create difficult Thermoform Molding conditions which may not be overcome by conventional forming methods.

As seen in FIG. 1 of Fishler, there is a compartment lid which extends over the opposed truck bed side rails. This arrangment interfaces with accessories that may otherwise be attached to the truck bed rails. A compartment lid, such as the one disclosed by Fishler, which has a width equal to or greater than the distance between the side walls at the front wall, also interferes with the installation of a protective roll-bar assembly of the type shown in U.S. Pat. No. 4,202,579 to Berggren.

The present invention is an improvement over the Fishler combination as well as the other prior art devices referenced. It is in the details of construction, utility and other added features of the present invention that there is found uniqueness and novelty.

SUMMARY OF THE INVENTION

It is the primary object of the present invention to provide a protective truck bed liner insert.

It is another object of the present invention to provide a truck bed insert that includes a storage chest covered with a hingedly attached and lockably secured chest lid.

It is still another object of the present invention to provide an insert with a cargo lid which is operable from either side of the vehicle.

It is still another object of the present invention to provide an insert that closely conforms to the contours of the metal truck bed, and can be further adapted for an over-the-rail border to protect the painted surfaces of the truck bed rails, or an under-the-rail border to expose the truck bed rail for the attachment of complementary accessories.

It is still another object of the present invention to provide a liner insert that is adapted to receive hinging and locking hardware, chest lid stay props, an auxiliary chest lid light and a chest drainage hole and plug.

It is still another object of the present invention to provide a liner insert which accommodates consolidated nesting for storage and shipping through the incorporation of inwardly sloping wall surfaces and generously radiused corners.

It is yet another object of the present invention to provide a storage chest occupying a space located behind the truck bed front wall and between the wheel wells.

It is still another object of the present invention to provide a space between the liner side walls and the storage chest for the purpose of accommodating a protective roll-bar assembly or auxiliary music speakers.

It is another object of the present invention to provide a chest lid with two-point locking hardware so that the chest lid can not be pried open for unwanted access to the cargo within the storage chest.

Still another object of the present invention is to provide a protective tailgate liner piece.

Briefly, in accordance with this invention, there is provided a unitarily formed liner insert, for installation into the bed of a pickup truck, consisting of a protective liner and a storage chest, combined with an independently formed, hinged, and lockably secured chest lid.

Other objects and advantages of the present invention will become apparent from the following description and appended claims when taken in conjunction with the accompanying drawings.

DESCRIPTION OF THE DRAWINGS

FIG. 7 is an enlarged perspective sectional view of the latching and locking mechanism, shown partly in phantom, of my present invention.

FIG. 8 is a perspective view of chest liner assembly in a truck bed with the lid open to better show the hardware and accessory add-ons of the invention.

FIG. 9 is a top view of the liner body showing the nesting characteristics of the liner and chest portions of the body.

DETAILED DESCRIPTION OF THE PREFERRED EMBODIMENT

Figure 1:
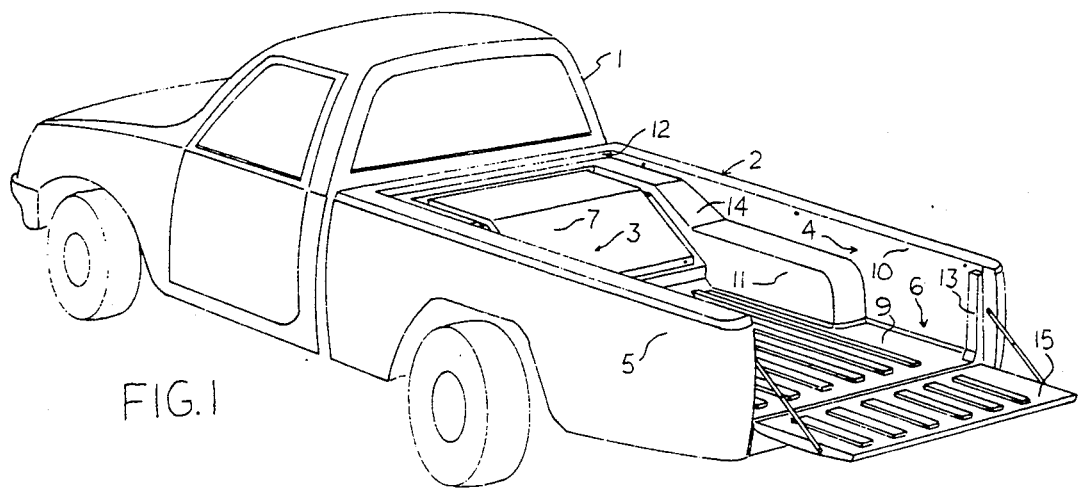
FIG. 1 is a perspective view of a pickup truck showing one embodiment of my combined truck bed liner and cargo chest invention.

Referring now to FIG. 1, there is seen a perspective view of a pickup truck vehicle 1 showing an insert assembly 2, with a forward storage chest 3, which occupies and lines the inside surface of the metal truck bed 5. The chest liner body 6 is unitarily Thermoformed from a resilient plastic material. The storage chest 3 includes a separately formed chest lid 7, which is hingedly and lockably secured to the chest liner body 6.

Figure 2:
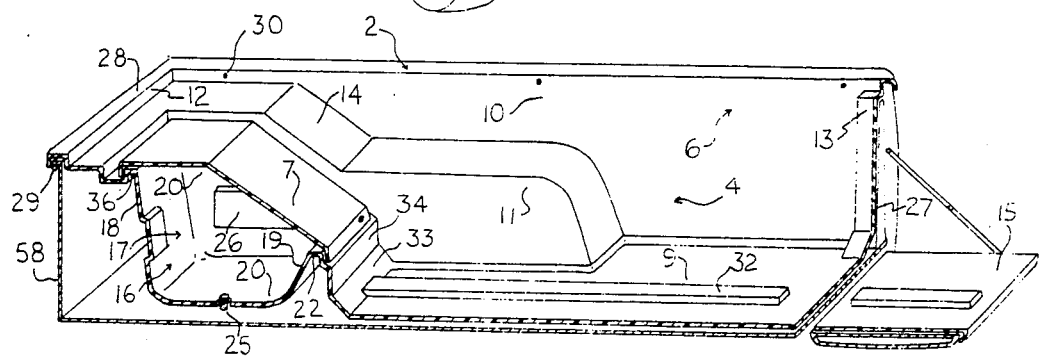
FIG. 2 is a perspective view showing the protective liner portion of the chest liner body.
Figure 3:
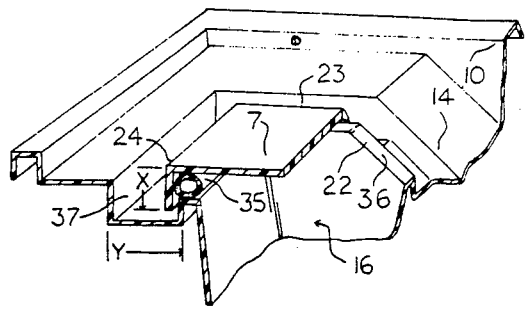
FIG. 3 is a perspective view of the support surface of the chest liner body.
Figure 4:
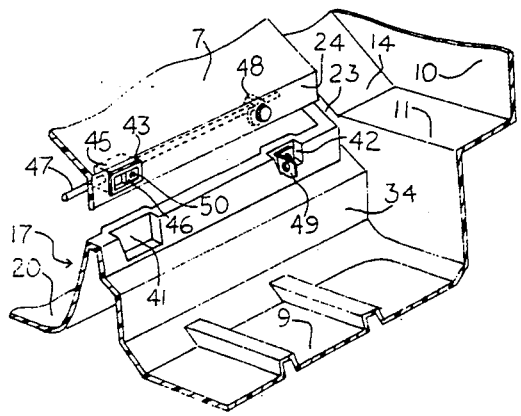
FIG. 4 is a perspective view of the storage chest portion of the liner body.

The chest liner assembly 2 comprises a body 6 with a protective liner portion 4, as best shown in FIG. 2, including a liner floor 9, opposed side walls 10, opposed wheel well enclosures 11, an upper front wall 12, a low front wall 34, and, a tailgate border area 13; a forward storage chest portion 17, as best seen in FIG. 3; a support surface 14, as best shown in FIG. 4; and, a tailgate liner piece 15.

Figure 5:
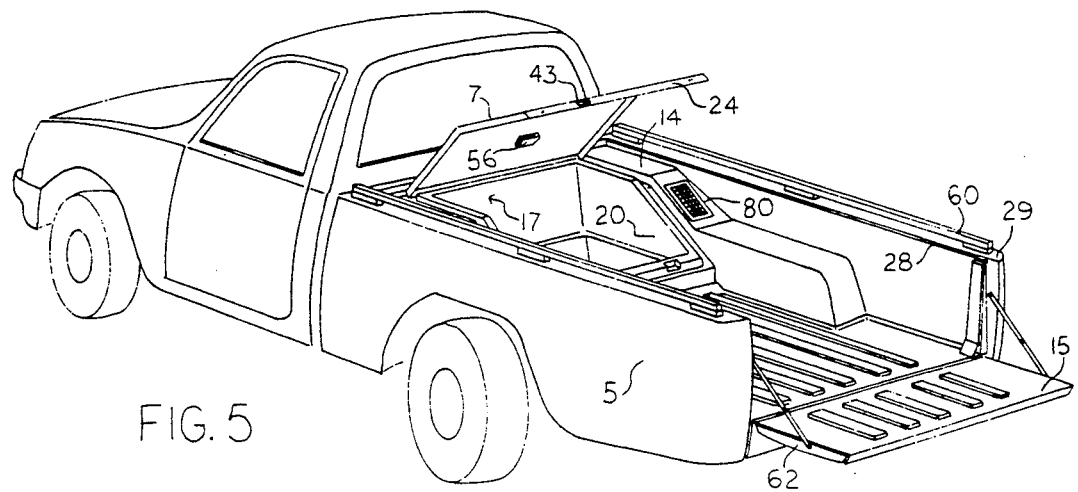
FIG. 5 is a perspective sectional view showing a combined truck bed liner and a forward chest in a sectioned truck bed.

Turning now to FIG. 5, the chest liner assembly 2 is shown with a forward storage chest, 16, comprising a front wall 18, a lower rear wall 19, side wall 20, and a bottom 21. The walls 18, 19 and 20 rise up at an angle greater than perpendicular from the bottom 21 to form a lip 22 defined by an outward extending border 36, upon which the chest lid 7 resides. The protective liner portion 4 and storage chest portion 17 of the liner body 6 is connected by a support surface 14, which traverses the distance there between. The support surface 14 includes a channel 23 which communicates with the outward extending border 36 of the chest lip 22. The channel 23 receives the downward extending lip 24 of the chest lid 7. The channel 23 has the benefit of directing water away from the storage chest 16, and toward the back rear of the chest liner assembly 2.

The storage chest bottom 21 may include a drain hole and plug combination 25. The chest walls 18, 19 and 20 may also include wall strengthening embosses or ribs 26. The embosses or ribs 26 may also be arranged to support chest trays.

As further seen in FIG. 5, The tailgate border area 13 of the protective liner portion 4 is shown to be adapted to the tailgate border area 27 of the metal truck bed 5. A closely fitting border 13 restricts the undesirable penetration of debris and moisture between the liner body 6 and truck bed 5.

The chest liner assembly 2 in FIG. 5 is shown to have an upper margin 28 extending over the rail 29 of the truck bed 5 to provide additional protection. The chest liner assembly 2 is secured to the truck bed rails 29 by means of a plurality of mechanical fasteners 30. In other embodiments the upper margin 28 of the liner side walls 10 terminate under the rail 29 of the truck bed 5 so the bed rails 29 are free for the installation of truck bed accessories.

The floor 9 of the liner body 6 shows raised ribs 32 upon which cargo can be slid. The ribs 32 extend generally from the front to the back in parallel fashion and may be incorporated into the radiused bed portion 33 connecting the liner floor 9 to the lower front wall 34 of the protective liner portion 4.

Figure 6:
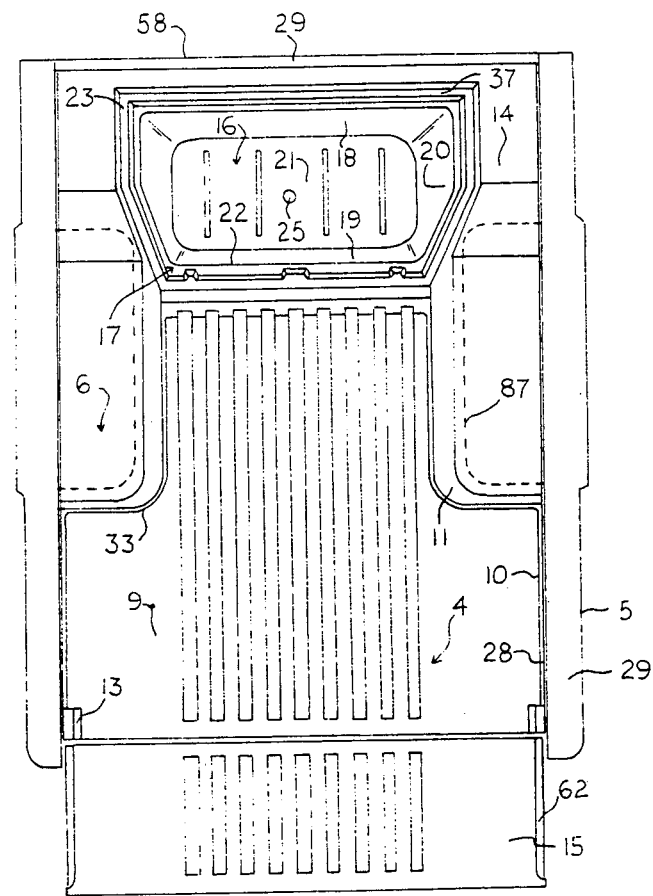
FIG. 6 is an enlarged perspective sectional view of the front left corner of the view seen in FIG. 5.

Turning now to FIG. 6, it can be seen in the enlarged cut away section of the front right corner of the view seen in FIG. 5, that the down turned lip 24 of the chest lid 7 is not as long "X" as the channel 23, of the support surface, is wide "Y". This relationship allows the lip 24 to pivot into the channel 23 when the chest lid 7 is opened and closed. The right and left sides of the channel 23 can be narrower than in the forward channel area 36. A compression seal gasket 35 may be interposed between chest lid 7 and chest lip 22 or channel 23 to further minimize debris and moisture penetration into the storage chest 16.

As can be seen in FIGS. 5 and 6, but more particularly in FIG. 4, a surface 14 is provided to connect the protective liner portion 4 to the storage chest portion 17 of the liner body 6. The support surface 14 communicates with the liner side walls 10, the upper front wall 12, the lower front wall 34 and the wheel well enclosures 11, all of the protective liner portion 4. The support surface 14 also communicates with the lip 22 formed about the storage chest 16. The support surface traverses a predetermined distance between the liner portion 4 and chest portion 17 such that the combined width of the support surface 14 and the front chest wall 18 substantially equals the width of the front wall 58 of the bed 5. The predetermined width of the support surface 14 between the liner side walls 10 and the storage chest 16 is derived from the outside diameter of the vertical member 72 of the protective roll bar assembly 71 that the support surface 14 must accommodate. This relationship is illustrated to advantage in FIG. 8. The supporting surface 14 communicates with the liner side walls 10 along a line defined by the down turned margin 39 of the bed rail 29, and may coexist on the same plane, or below, as the surface of the chest lid 7.

Turning now to FIG. 7, a lock chamber recess 41 and one or more locking plate recesses 42 are molded into the channel 23 of the support surface 14, above the lower front wall 34, so that a locking device 43 can be flush mounted to the lid lip 24, for the prevention of theft and vandalism. As in the present embodiment, the locking device 43 comprises a chamber 45 with a latch 46 that retracts and extends one or more rods 47 through at least one guide 48 that locates the rod 47 through a locking plate 49 mounted to the channel 23. When the latch 46 is closed the rods 47 are extended through the locking plates 49 to prevent unwanted access to the storage chest 17. The latch 46 us opened and rods 47 retract from the locking plates 49, allowing the chest lid 7 to be opened. The latch 45 may comprise a key lock 50 to provide extra security.

In FIG. 8, the protective liner portion 4 is shown with an upper margin 28 extending under the truck bed rail 29, for the installation of an accessory tie down rack 60 on the rail 29 of the truck bed 5. Music speakers 80 are attached to the support surface 14 for the pleasure of family picnics and benefit of sales presentations. The chest lid 7 is seen supporting an auxiliary chest light 56, which may be manually operated.

Now in reference to FIG. 9, a top view of the liner body 6 is provided. The storage chest 16 is located to the rear of the front wall 58 of the truck bed 5, and the width of the storage chest 16 at the front liner wall 18 is substantially narrower than wall 58. The storage chest 16 extends between the wheel wells (shown in phantom) of the truck bed 5, to increase the capacity of the storage chest 16. In the liner body 6 embodiment of FIG. 9, the side walls 10 include upper margins 28 which terminate under the truck bed rails 29, for accommodating truck bed 5 accessories.

Further, as can be seen, the protective liner portion 4 and storage chest portion 17 of the liner body 6, are broadly curved or radiused to enhance material thickness in the thermoforming process as well as to provide greater nestability for more economical storage and shipping. To maximize nestability, the liner side walls 10, wheel well enclosures 11 and walls 18, 19, and 20 of the storage chest 16, all rise up form liner body 6 floor 9 and bottom 21 at an angle greater than perpendicular.

It will be understood that the disclosure herein relates only to the preferred embodiment of the present invention, and that numerous alterations, changes and modifications can be made to the assembly and apparatus herein disclosed without departing from the spirit and scope of the invention as set forth in the appended claims.

I claim:

1. An insert for a pickup truck vehicle having a truck bed including a floor, a front wall, opposed side walls whose upper margins are defined by a downward extending bed rail, opposed wheel wells and a tailgate border opening, said insert comprising:

a unitarily formed insert having a protective liner portion and a storage chest portion, said liner and chest portions being connected therebetween by a supporting surface;

said protective liner portion comprising a floor, an upper front wall, a lower front wall, opposed wheel well enclosures and a tailgate border opening;

said storage chest portion comprising a bottom, opposed side walls, a front wall substantially narrower than the width between the truck bed side walls and a rear wall substantially lower than the chest front wall;

said chest walls rising up at an angle greater than perpendicular from said bottom to form a compartment lip defined by an outward extending surface;

said storage chest of the unitary insert being joined to the protective liner portion below an elevation defined by the downward extending bed rail;

said supporting surface of the unitarily formed insert being further joined to the storage chest portion about the outward extending lip of said chest;

said supporting surface including a channel, said channel being in communication with said lip of said chest;

said supporting surface further comprising opposed flat surfaces traversing said joining of the supporting surface to the protective liner portion to said channel, such that said surface and said storage chest extend in width substantially the distance defined by the length between the opposed side walls at the front wall of said truck bed.

2. An insert as described in claim 1 wherein;
said chest includes a drain and plug for water removal and retention.

3. An insert as described in claim 1 wherein;
said protective liner side walls and front walls includes an upper margin extending over the truck bed rails.

4. An inset assembly for a pickup truck vehicle having a truck bed including a floor, a front wall, opposed side walls whose upper margins are defined by downward extending rails, opposed wheel wells and tailgate border opening, said insert assembly comprising:

a unitarily formed liner body including a protective liner portion a storage chest portion and a supporting surface; and a chest lid hingedly attached and lockably secured to said liner body;

said protective liner portion of said liner body comprising a floor, an upper front wall, a lower front wall, opposed side walls, opposed wheel well enclosures and a tailgate border opening;

said storage chest portion of said liner body comprising a bottom, opposed side walls, a front wall substantially narrower than the width of the truck bed front wall and rear wall substantially lower than the chest front wall;

said chest walls rising up at an angle greater than perpendicular from the chest bottom to form a chest lip defined by an outward extending surface;

said liner and chest portions of said liner body being joined therebetween by a support surface, said support surface being disposed at below an elevation defined by the downward extent of the bed rails to traverse to the outward extending chest lip;

said support surface further comprising a channel contiguously associated with the opposed sides and front lips of the storage chest; and said chest lid having a width substantially less than the distance defined by the front walls between the opposed truck bed side walls, and an engaged downward extending lip about said chest lid.

5. An insert assembly as defined in claim 4 wherein;
the storage chest lid is lockably secured to the liner body above the lower front wall of the liner portion at the right and left recesses formed along the rear of the support surface where said surface communicates with the outward extending lip of the chest.

6. An insert assembly as in claim 4 where the distance traversed by the supporting surfaces between the liner side walls and the outward extending lip of the storage chest are predetermined to accept the vertical members of a protective roll-bar assembly.

7. An insert assembly as described in claims 4 where the storage chest lid communicates with the outward extending lip of the storage chest.

8. An insert assembly as described in claim 4 where the storage chest lid lip extends downward to reside within the channel formed in the supporting surface.

9. An insert assembly as described in claim 4 where the storage chest lid includes an auxiliary light to illuminate the storage chest.

* * * * *